(12) United States Patent
Ouyang et al.

(10) Patent No.: US 9,390,848 B2
(45) Date of Patent: Jul. 12, 2016

(54) INTEGRATED MAGNETICS TRANSFORMER ASSEMBLY

(71) Applicant: Danmarks Tekniske Universitet, Kgs. Lyngby (DK)

(72) Inventors: Ziwei Ouyang, Holte (DK); Michael A. E. Andersen, Helsinge (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 14/772,496

(22) PCT Filed: Feb. 28, 2014

(86) PCT No.: PCT/EP2014/053930
§ 371 (c)(1),
(2) Date: Sep. 3, 2015

(87) PCT Pub. No.: WO2014/135449
PCT Pub. Date: Sep. 12, 2014

(65) Prior Publication Data
US 2016/0020016 A1    Jan. 21, 2016

(30) Foreign Application Priority Data
Mar. 5, 2013   (EP) .................................... 13157764

(51) Int. Cl.
*H01F 27/28*   (2006.01)
*H01F 27/34*   (2006.01)
(Continued)

(52) U.S. Cl.
CPC ................ *H01F 27/34* (2013.01); *H01F 27/24* (2013.01); *H01F 27/28* (2013.01);
(Continued)

(58) Field of Classification Search
CPC ........................................... H01F 27/00–27/30
USPC ............. 336/65, 83, 170–173, 212, 214–215, 336/233–234
See application file for complete search history.

(56) References Cited

U.S. PATENT DOCUMENTS 3,522,592 A * 8/1970 Waas ..................... G11C 17/02
307/423
3,541,428 A * 11/1970 Schwarz ................. H01F 19/02
307/401
(Continued)

FOREIGN PATENT DOCUMENTS

CN          101309049 A      11/2008
EP            2071596         6/2009
WO          2013037696        3/2013

*Primary Examiner* — Tuyen Nguyen
(74) *Attorney, Agent, or Firm* — Peter A. Nieves; Sheehan Phinney Bass & Green PA

(57) ABSTRACT

The present invention relates to an integrated magnetics transformer assembly comprising a first magnetically permeable core forming a first substantially closed magnetic flux path and a second magnetically permeable core forming a second substantially closed magnetic flux path. A first input inductor winding is wound around a first predetermined segment of the first magnetically permeable core and a second input inductor winding is wound around a first predetermined segment of the second magnetically permeable core. The integrated magnetics transformer assembly further comprises a first output inductor winding comprising series coupled first and second half-windings wherein the first half-winding is wound around a second predetermined segment of the first magnetically permeable core and the second half-winding is wound around a second predetermined segment of the second magnetically permeable core. A second output inductor comprises series coupled first and second half-windings wherein the first half-winding is wound around a third predetermined segment of the first magnetically permeable core and the second half-winding is wound around a third predetermined segment of the second magnetically permeable core. The second half-winding of the first output inductor winding and the second half-winding of the second output inductor winding are configured to produce oppositely directed magnetic fluxes through the second substantially closed magnetic flux path and the first half-winding of the first output inductor winding and the first half-winding of the second output inductor winding are configured to produce aligned, i.e. in the same direction, magnetic fluxes through the first substantially closed magnetic flux path. The integrated magnetics transformer assembly is well-suited for use in a broad range of single input or multiple-input isolated power converter topologies.

18 Claims, 11 Drawing Sheets

(51) Int. Cl.
*H02M 1/10* (2006.01)
*H02M 3/28* (2006.01)
*H02M 3/335* (2006.01)
*H01F 27/24* (2006.01)
*H02M 5/293* (2006.01)
*H02M 7/06* (2006.01)
*H02M 7/217* (2006.01)

(52) U.S. Cl.
CPC ............ *H01F 27/2804* (2013.01); *H02M 1/10* (2013.01); *H02M 3/285* (2013.01); *H02M 3/33561* (2013.01); *H02M 3/33569* (2013.01); *H02M 3/33576* (2013.01); *H02M 5/293* (2013.01); *H02M 7/06* (2013.01); *H02M 7/217* (2013.01); *H01F 2027/2809* (2013.01)

(56) References Cited

U.S. PATENT DOCUMENTS

| | | | |
|---|---|---|---|
| 5,177,460 A * | 1/1993 | Dhyanchand | H02M 7/49 336/12 |
| 5,355,296 A * | 10/1994 | Kuo | H02M 7/49 336/182 |
| 7,289,338 B2 | 10/2007 | Kawaski et al. | |
| 7,332,992 B2 * | 2/2008 | Iwai | H01F 27/255 336/170 |
| 8,064,228 B2 | 11/2011 | Lee et al. | |
| 8,213,188 B2 | 7/2012 | Tada et al. | |
| 2006/0186981 A1 | 8/2006 | Jang et al. | |
| 2009/0185398 A1 | 7/2009 | Cuk | |
| 2014/0241012 A1* | 8/2014 | Lindberg-Poulsen | H02M 3/33523 363/17 |

* cited by examiner

A)

B)

A)

B)

US 9,390,848 B2

INTEGRATED MAGNETICS TRANSFORMER ASSEMBLY

CROSS-REFERENCE TO RELATED APPLICATIONS

This application is the national phase application pursuant to 35 U.S.C. §371 of International Application No. PCT/EP2014/053930, filed Feb. 28, 2014, which claims priority to European Application No. 13157764.5, filed Mar. 5, 2013. These applications are hereby incorporated by reference in their entireties.

The present invention relates to an integrated magnetics transformer assembly comprising a first magnetically permeable core forming a first substantially closed magnetic flux path and a second magnetically permeable core forming a second substantially closed magnetic flux path. A first input inductor winding is wound around a first predetermined segment of the first magnetically permeable core and a second input inductor winding is wound around a first predetermined segment of the second magnetically permeable core. The integrated magnetics transformer assembly further comprises a first output inductor winding comprising series coupled first and second half-windings wherein the first half-winding is wound around a second predetermined segment of the first magnetically permeable core and the second half-winding is wound around a second predetermined segment of the second magnetically permeable core. A second output inductor comprises series coupled first and second half-windings wherein the first half-winding is wound around a third predetermined segment of the first magnetically permeable core and the second half-winding is wound around a third predetermined segment of the second magnetically permeable core. The second half-winding of the first output inductor winding and the second half-winding of the second output inductor winding are configured to produce oppositely directed magnetic fluxes through the second substantially closed magnetic flux path and the first half-winding of the first output inductor winding and the first half-winding of the second output inductor winding are configured to produce aligned, i.e. in the same direction, magnetic fluxes through the first substantially closed magnetic flux path. The integrated magnetics transformer assembly is well-suited for use in a broad range of single input, multiple-input or multiple-output isolated power converter topologies.

BACKGROUND OF THE INVENTION

In order to combine power generated from two or more independent input voltage or energy sources to generate a regulated DC output voltage, numerous topologies of multiple-input power converters have been proposed in recent years. The independent input voltage or energy sources may for example comprise clean energy sources such as solar arrays, wind turbines, fuel cells, batteries and commercial ac power lines. A common limitation of some known multiple-input power converters is that only a single input voltage or power source is allowed to transfer power or energy to the converter output at a time to prevent power coupling effects. These power coupling effects may introduce circulating currents in a primary side of a power converter transformer and its associated input driver circuitry. These power coupling effects therefore induce considerable power loss in the primary side of the power converter transformer and its associated input driver circuitry and may seriously damage the driver circuitry. The present invention proposes new circuit topologies for single input and multiple-input isolated power converters using separate multiple-winding transformers with a novel winding connection of secondary side half-windings. The idea behind the present invention origins from the isolated power converter topologies described in the present applicant's published PCT patent application WO2013/037696 "An integrated magnetics component" relating to a novel four quadrant integrated transformer (FQIT) for single input or multiple-input power converters. The FQIT based power converter topologies enable full decoupling between multiple primary or input side inductor windings of the transformer assembly such that two separate input power sources are allowed to transfer energy into a converter output simultaneously or at any time-multiplexing scheme without undesired power coupling effects.

The present invention provides in one aspect a novel integrated magnetics transformer assembly which is electrically equivalent to the FQIT despite possessing a markedly different magnetic core geometry. Despite the considerable number of advantages offered by power converters based on the FQIT core geometry, it remains at present a customized structure which may require specialized manufacturing tooling. In contrasts, the present integrated magnetics transformer assembly may be based on two magnetically permeable cores of conventional core geometry such as the E-shape. These traditional core geometries are readily available from numerous sources and at low cost. Furthermore, the equivalent circuit structure of the present integrated magnetics transformer assembly enables a convenience on the electrical analysis and simulation together with a straightforward understanding of operational principles of power converters based on the present integrated magnetics transformer assembly.

SUMMARY OF THE INVENTION

A first aspect of the invention relates to an integrated magnetics transformer assembly, or discrete transformer assembly, comprising a first magnetically permeable core forming a first substantially closed magnetic flux path and a second magnetically permeable core forming a second substantially closed magnetic flux path. A first input inductor winding is wound around a first predetermined segment of the first magnetically permeable core and a second input inductor winding is wound around a first predetermined segment of the second magnetically permeable core. The integrated magnetics transformer assembly further comprises a first output inductor winding comprising series coupled first and second half-windings wherein the first half-winding is wound around a second predetermined segment of the first magnetically permeable core and the second half-winding is wound around a second predetermined segment of the second magnetically permeable core. A second output inductor comprises series coupled first and second half-windings wherein the first half-winding is wound around a third predetermined segment of the first magnetically permeable core and the second half-winding is wound around a third predetermined segment of the second magnetically permeable core. The second half-winding of the first output inductor winding and the second half-winding of the second output inductor winding are configured to produce oppositely directed magnetic fluxes through the second substantially closed magnetic flux path and the first half-winding of the first output inductor winding and the first half-winding of the second output inductor winding are configured to produce aligned, i.e. in the same direction, magnetic fluxes through the first substantially closed magnetic flux path.

The distribution of the respective first and second half-windings of the first and second output inductor windings between the first and second magnetically permeable cores in conjunction with the oppositely directed magnetic fluxes provided by the configuration of the respective second half-windings of the first and second output inductor windings leads to numerous benefits. The oppositely directed magnetic fluxes may lead to complete, or at least partial, cancellation of magnetic flux in the first, second and third predetermined segments of the second magnetically permeable core from the flow of current through the second half-winding of the first output inductor winding and the second half-winding of the second output inductor winding. This magnetic flux cancellation leads to an advantageous suppression or elimination of voltage reflected back from the second output inductor winding to the second input inductor winding. The latter may be arranged at a primary side of the second magnetically permeable cores. Hence, full or at least partial magnetic decoupling of the first and second input inductor windings has been achieved in the present integrated magnetics transformer assembly as explained in further detail below in connection with the description below of the appended drawings.

Each of the first and second magnetically permeable cores preferably comprises a material possessing high magnetic permeability such as a soft magnetic material like Ferrite or a ferromagnetic alloy like Sheet steel, Silicon steel, cast steel, Tungsten steel, Magnet steel, cast iron, Nickel etc.

The first and second magnetically permeable cores of the present integrated magnetics transformer assembly are preferably completely separate mechanical structures held in a fixed or predetermined spatial relationship by a suitable holding member or carrier, preferably made of non-permeable material such as a plastic or elastomeric compound. The predetermined spatial relationship may include a certain minimum distance such as a distance between 2 mm and 50 mm, preferably a distance of at least 6 mm, between the first and second magnetically permeable cores. In this manner, the first magnetically permeable core in conjunction with the first input inductor winding, the first half-winding of the first output inductor winding and the first half-winding of the second output inductor winding form a first transformer. Likewise, a second transformer is formed by the second magnetically permeable core in conjunction with the second input inductor winding, the second half-winding of the first output inductor winding and the second half-winding of the second output inductor winding. According to one embodiment, the holding member comprises a printed circuit board. The printed circuit board (PCB) portion of the holding member may comprise various externally accessible input and output terminals or pads electrically connected to respective ones of first and second input inductor windings and the first and second output inductor windings for example through respective wire terminations of these inductor windings. Hence, the holding member may provide a desirable structural integrity and electrical connectivity to the integrated magnetics transformer assembly. Other components of the power converter can also be integrated on the PCB such that effective modularization of the power converter is enabled.

A preferred embodiment of the printed circuit board of the holding member comprises a multi-layer printed circuit board which provides additional flexibility to the transformer assembly, preferably by providing several of the input and output inductor windings as respective winding patterns in layer of the multi-layer PCB. One embodiment of the multi-layer printed circuit board comprises a first through going aperture and a second through going aperture. The common straight leg of the first magnetically permeable core is projecting through the first through going aperture and the common straight leg of the second magnetically permeable core is projecting through the second through going aperture. A first board wiring pattern is arranged around the first through going aperture and comprises at least one of the first input inductor winding, the first half-winding of the first output inductor winding and the first half-winding of the second output inductor winding. A second board wiring pattern is arranged around the second through going aperture and comprises at least one of the second input inductor winding, the second half-winding of the first output inductor winding and the second half-winding of the second output inductor winding. The skilled person will understand that the multi-layer printed circuit board may comprise one or more additional through going apertures to accommodate additional legs of the first and second magnetically permeable cores, e.g. four additional legs for a pair E-shaped magnetically permeable cores.

Other embodiments of the integrated magnetics transformer assembly comprise conventional wire type and wire material such as solid copper wire or litz wire for each of the first and second input inductor windings and each of first and second output inductor windings. Further embodiments of the integrated magnetics transformer assembly may use a combination of the above-mentioned PCB based wiring and the conventional types of wires.

It is a significant advantage of the present integrated magnetics transformer assembly that each of the first and second magnetically permeable cores may possess the conventional transformer core geometry such as E-shaped, toroid shaped, rectangular etc. Hence, the first core may comprise a first substantially rectangular core portion formed by mechanical coupling of three substantially straight legs and the common straight leg and the second core comprises a second substantially rectangular core portion formed by mechanical coupling of three substantially straight legs and the common straight leg. In another E-shaped core embodiment, the integrated magnetics transformer assembly comprises first and second magnetically permeable E-shaped cores wherein each of the E-shaped cores comprises the common leg arranged in-between a pair adjacent outer legs. These traditional core geometries are readily available from numerous manufacturers or supply sources at low cost such that the present integrated magnetics transformer assembly can be constructed from two of these traditional cores in combination with appropriately arranged input and output transformer windings.

The advantageous configuration of the second half-winding of the first output inductor winding and the second half-winding of the second output inductor winding where these half windings produce oppositely directed magnetic fluxes can be achieved by different half-winding arrangements on the second core depending on the chosen core geometry. In a preferred embodiment, the first half-winding of the first output inductor winding and the first half-winding of the second output inductor winding are wound around a common straight leg of the first core; and the second half-winding of the first output inductor winding and the second half-winding of the second output inductor winding are wound around a common straight leg of the second core. The first half-winding of the first output inductor winding and the first half-winding of the second output inductor winding are connected in same direction and the second half-winding of the first output inductor winding and the second half-winding of the second output inductor winding are connected in reverse direction. In this winding arrangement, the first half-winding of the first output inductor winding and the first half-winding of the second output inductor winding produce magnetic fluxes in the same direction through the common leg of the first core while the second half-winding of the first output inductor winding and the second half-winding of the second output inductor winding produce magnetic fluxes in the opposite direction through the common leg of the second core. The skilled person will understand that the magnetic fluxes in the second core generated by the second half-windings are preferably oppositely directed not only through the common leg of the second core, but at all points throughout the second substantially closed magnetic flux path. Likewise, the magnetic fluxes in the first core generated by the first half-windings are preferably flowing in the same direction at all points throughout the second substantially closed magnetic flux path.

The first input inductor winding is preferably configured or oriented such that it produces magnetic flux in the same direction as the first half-windings. The second input inductor winding is preferably configured or oriented such that it produces magnetic flux in the same direction as the second half-winding of the first output inductor winding and therefore in opposite direction to the magnetic flux produced by the second half-winding of the second output inductor winding. The first input inductor winding is preferably wound around the common straight leg of the first magnetically permeable core and the second input inductor winding is preferably wound around the common straight leg of the second magnetically permeable core. In the latter embodiment, good magnetic coupling with minimal flux leakage is maintained between each input inductor winding and the first and second half-windings of the each of the output inductor windings on each of the first and second cores. According to one variant of the latter embodiment, the first input inductor winding, the first half-winding of the first output inductor winding and the first half-winding of the second output inductor winding are arranged adjacently on the common straight leg of the first core. Likewise, the second input inductor winding, the second half-winding of the first output inductor winding and the second half-winding of the second output inductor winding are arranged adjacently on the common straight leg of the second magnetically permeable core. The skilled person will appreciate that input and output inductor windings arranged on a common leg of the first core may partially or fully overlap i.e. being partially or fully interleaved such that the first and second segments of the first core partly or fully overlap. The same applies for the input and output inductor windings on the second core.

According to a preferred embodiment of the present integrated magnetics transformer assembly, the first and second half-windings of the first output inductor winding comprises the same number of turns and the first and second half-windings of the second output inductor winding comprises the same number of turns. The skilled person will understand that the number of windings of the first and second half-windings of the first output inductor winding may differ in alternative embodiments and the number of windings of the first and second half-windings of the second output inductor winding may differ as well. However, the number of turns of the second half-windings of the first and second output inductor windings is preferably identical to facilitate to good magnetic flux cancellation in the second core.

A second aspect of the present invention relates to a single input or multiple-input isolated power converter comprising an integrated magnetics transformer assembly according to any of the above-described embodiments thereof. The single input or multiple-input isolated power converter comprises a first input terminal connectable to a first DC or AC input voltage source. A first input driver is operatively coupled to the first DC or AC input voltage and the first input inductor winding to supply a first drive signal thereto. The single input or multiple-input isolated power converter further comprises a second input terminal connectable to the first DC or AC input voltage or a second DC or AC input voltage source. A second input driver is operatively coupled to the first or second DC or AC input voltage and the second input inductor winding to supply a second drive signal thereto. A first rectifier or a first inverter element is operatively coupled between a first converter output and a pair of winding terminations of the series coupled first and second half-windings of the first output inductor winding and a second rectifier or a second inverter element is operatively coupled between a second converter output and a pair of winding terminations of the series connected first and second half-windings of the second output inductor winding.

The present single input or multiple-input isolated power converter may be embodied in a wide range of useful DC-DC or DC-AC power converter topologies. The DC-DC isolated power converter topologies include the first and second rectifiers to rectify the first and second AC voltages supplied across the respective pairs of winding terminations of the series coupled first and second half-windings of the first and second output inductor windings. Each of the first and second rectifiers may include a semiconductor diode or a semiconductor diode bridge or a transistor switch based synchronous rectifier. The DC-DC isolated power converter topologies comprises DC-DC isolated boost converters, DC-DC isolated buck converters, DC-DC dual active bridge (DAB) converters, isolated two inductor one capacitor (LLC) resonant DC-DC power converters etc. as explained in additional detail below in connection with the appended figures. The first and second converter outputs may be separate voltage nodes providing two independent or separate rectified DC output voltages of the single input or multiple-input isolated DC-DC power converter. In other useful embodiments, the first and second converter outputs are coupled to a common output node to provide a single rectified DC output voltage of the power converter.

The DC-AC isolated power converter topologies, often designated power inverters, comprise the first and second inverter elements to convey, and possibly filter, the first and second AC voltages, generated across the respective pairs of winding terminations of the series coupled first and second half-windings, before application to the first and second converter outputs as respective AC output voltages of the DC-AC isolated power converter. Hence, the first and second inverter elements may for example comprise respective smoothing inductors.

Finally, the skilled person will understand that the first input terminal and the second input terminal of the present isolated power converter may be coupled to a single common DC or AC input voltage in the single input embodiments of the present power converter. In the latter embodiments, the first and second input drivers are effectively coupled in parallel to the first DC or AC input voltage source.

The skilled person will appreciate that the designations 'input' of the first and second input inductor windings and the designations 'output' of the first and second output inductor windings are all arbitrary and may be interchanged depending on how the integrated magnetics transformer assembly is electrically interconnected or coupled in a specific isolated power converter design. This feature is an inherent consequence of the reciprocal nature of all transformer functions.

Therefore, in accordance with an alternative set of embodiments of the present single input or multiple-input isolated power converters, the first and second output inductor windings are operatively connected to respective inputs of a primary side of the power converter while the first and second input inductor windings are operatively coupled to a common or separate outputs of a secondary side of the power converter. According to these so-called side-shifted winding embodiments, the single input or multiple-input isolated power converter comprises an integrated magnetics transformer assembly according to any of the above-described embodiments thereof. The first input terminal of the multiple-input isolated power converter is connectable to a first DC or AC input voltage and the first input driver is operatively coupled to the first DC or AC input voltage and to the pair of winding terminations of the series coupled first and second half-windings of the first output inductor winding to supply a first drive signal thereto. The second input terminal is connectable to the first or the second DC or AC input voltage and the second input driver is operatively coupled to the first or the second DC or AC input voltage and the pair of winding terminations of the series connected first and second half-windings of the second output inductor winding to supply a second drive signal thereto. The first rectifier, or the first inverter element, is operatively coupled between the first converter output and the first input inductor winding and the second rectifier, or the second inverter element, is operatively coupled between the second converter output and the second input inductor winding.

Boost topologies of the single input or multiple-input isolated power converter may comprise a first boost inductor coupled between the first DC or AC input voltage and the first input driver and a second boost inductor coupled between the second DC or AC input voltage and the second input driver. Buck topologies of the single input or multiple-input isolated power converter may comprise first and second separate buck inductors coupled between outputs of the first and second rectifiers, respectively, and a common or shared converter output. A particular advantageous buck implementation of the present multiple-input isolated power converter comprises a single or first buck inductor coupled in-between the common converter output and a common node of the outputs of the first and second rectifiers. The ability of certain buck topologies of the present single input or multiple-input isolated power converter to share a common buck inductor is a unique advantage.

Each of the first and second input drivers may comprise well-known driver topologies such as a half-bridge driver or an H-bridge driver configured for applying the drive signal across the first or second input inductor winding. According to one such embodiment the first input driver comprises a first H-bridge having a pair of complementary outputs connected to respective winding terminations of the first input inductor winding. Furthermore, the second input driver comprises a second H-bridge having a pair of complementary outputs connected to respective winding terminations of the second input inductor winding. The first and second drive signals, applied to the first and second input inductor windings, respectively, preferably comprise respective PWM modulated drive signals. Duty cycles of the first and second PWM modulated drive signals may be adjusted to provide converter output voltage control or regulation by a suitable feedback control loop of the multiple-input isolated power converter. Each input driver may comprise a single or a plurality of appropriately arranged semiconductor switches such as IGBT switches or MOSFET switches to form the well-known driver topologies.

The skilled person will understand that each of the first and rectifiers may comprise a plurality of rectifying elements such as semiconductor diodes for example two semiconductor diodes configured as a half-wave rectifier or four semiconductor diodes configured as a full-wave rectifier. In alternative embodiments, each of the first and rectifiers may comprise a plurality of transistor switches, e.g. MOS-FETs, configured as respective active diodes to enable synchronous rectification and support reverse power transfer.

The first and second converter outputs may be configured in different ways. In a number of useful embodiments the first and second converter outputs are combined to form a common output node producing a single DC output voltage of the multiple-input isolated power converter. One or several output capacitor(s) may be coupled to the common output node to suppress ripple voltages in the DC output voltage produced by respective rectified voltage waveforms at the outputs of the first and second rectifiers. According to these embodiments, the DC output voltage is produced by a combination of voltage or power contributions from the first and second rectifiers. An alternative embodiment of the single input or multiple-input isolated power converter is configured to produce separate first and second DC output voltages, or first and second separate AC output voltages, at separate output voltage terminals. The use of separate DC output voltages have been impossible in prior art multiple-input power converters based on traditional transformer core geometries due to the cross-regulation problems caused by the coupling between the input and the output of the transformer windings. However, the decoupling of the first and second input transformer windings as well as the first and second output transformer windings enabled by the integrated magnetics transformer assembly renders the first and second separate DC output voltages completely independent.

Consequently, the same isolated power converter can be readily adapted to fit a variety of different power converter or inverter applications and therefore reduce the number of variants required of a particular power converter topology. Hence, the present isolated power converter is capable of lowering assembly costs, component costs, stock costs etc. The flexibility offered by the present single input or multiple-input isolated power converter is particularly well-suited for power conversion in connection with clean energy sources like photovoltaic cells which often generate a wide range of different input voltages for power converters.

Finally, the skilled person will understand that the present integrated magnetics transformer assembly also may be integrated in numerous other well-known DC-DC isolated power converter topologies such as flyback topologies, forward topologies, push-pull topologies, SEPIC topologies, current doubler rectifier topologies etc.

BRIEF DESCRIPTION OF THE DRAWINGS

Preferred embodiments of the invention will be described in more detail in connection with the appended drawings, in which.

DETAILED DESCRIPTION OF PREFERRED EMBODIMENTS

Figure 1:
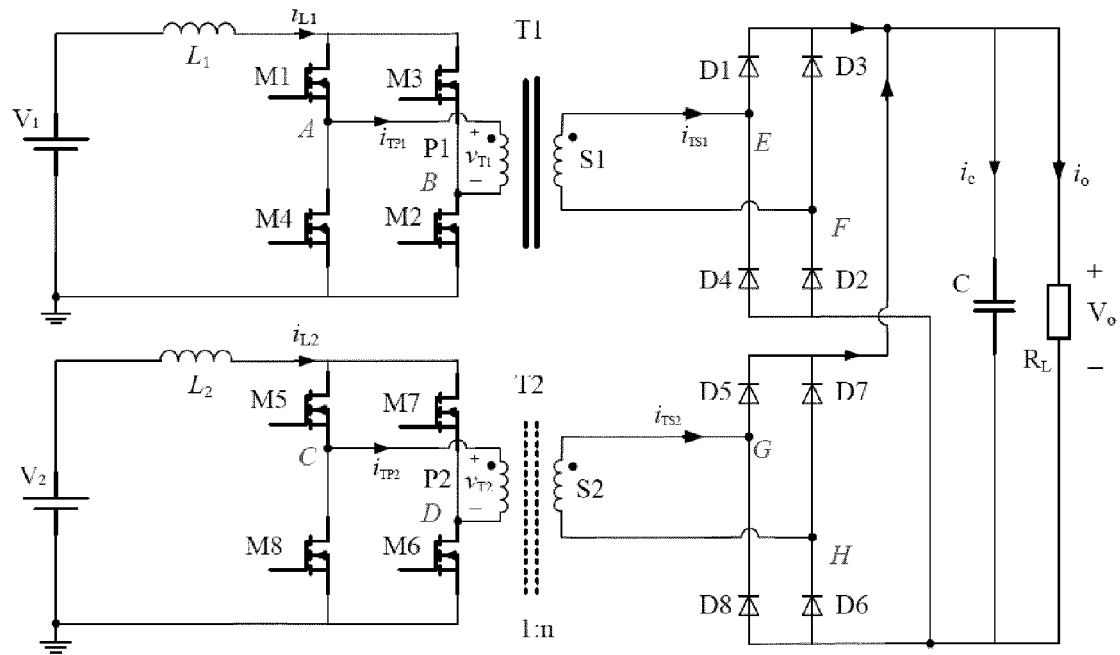
FIG. 1A is a schematic drawing of a prior art dual-input isolated boost DC-DC power converter comprising two fully parallel converters and common converter output.
FIG. 1B is a schematic drawing of a prior art dual-input isolated boost DC-DC power converter comprising series connected secondary windings coupled to a single converter output.
Figure 1:
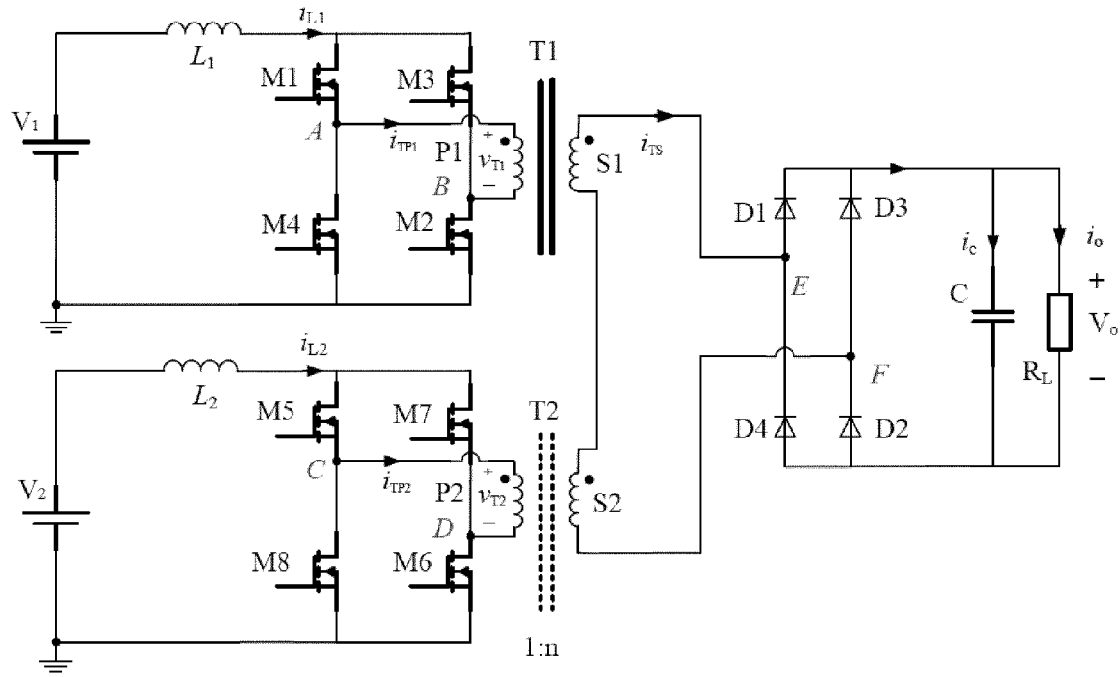

FIG. 1A shows a schematic drawing of a prior art dual-input isolated boost DC-DC power converter comprising two fully parallel converters and a common converter output. The power converter comprises two converter stages, build around transformer T1 and transformer T2, respectively, and operating fully in parallel with a common output capacitor C. The two transformers T1 and T2 are fully separate. The input inductor winding or primary winding of T1 is driven by a first H-bridge driver comprising MOSFET switches M1-M4 while the input inductor winding of T2 is driven by a second, separate, H-bridge driver comprising MOSFET switches M5-M8.

This prior art power converter possesses a boost-type structure or topology with a common output DC output across output capacitor C such that only one converter stage at a time is allowed to transfer energy from either of the DC input voltage sources $V_1$ and $V_2$ to the load $R_L$. Otherwise, the other converter stage stops working because the H-bridge rectifier of the other converter stage is blocked if there is any duty cycle mismatch, phase mismatch or input voltage mismatch between inputs of the two converter stages. Even though this problem can be addressed with input current control, similar and even more difficult problems arise in buck topology multiple-input power converters. The voltage transfer functions between the DC output voltage $V_O$ across the output capacitor C and the first DC input voltage $V_1$ and the second DC input voltage $V_2$ can be shown to be respectively:

$$\frac{V_O}{V_1} = \frac{n_1}{2(1-D_1)} \text{ and } \frac{V_O}{V_2} = \frac{n_1}{2(1-D_2)},$$

where $n_1$ is the turns ratio of the each of the transformers T1 and T2; $D_1$ is a duty cycle of a first PWM drive signal applied by the first H-bridge driver to the first input inductor winding or primary winding P1; $D_2$ is a duty cycle of a second PWM drive signal applied to the second input inductor winding or primary winding P2 of T2.

The two DC voltage transfer functions are independent and such that the DC output voltage $V_O$ of the power converter is only determined by a single input voltage source and its corresponding duty cycle.

FIG. 1B is a schematic drawing of another prior art dual-input isolated boost DC-DC power converter comprising two fully parallel converter stages build around transformer T1 and transformer T2, respectively, and a common converter output. However, the secondary windings S1 and S2 of transformer T1 and T2 are arranged in series and connected to a single shared full-wave rectifier comprising diodes D1-D4. The output of the rectifier is coupled to a single output capacitor C. This power converter topology allows the two converter stages to transfer energy from input sources $V_1$ and $V_2$ to the load $R_L$ within a certain range of phase shift between PWM modulated drive signals at the expense of an undesired and relatively large circulating current in the second H-bridge input driver (MOSFETs M5-M7) and primary side of the transformer T2 when the transformer T1 is active. The circulating current leads to substantial power losses in this prior art DC-DC power converter.

The range of multiple-input isolated power converters disclosed below in accordance with various exemplary embodiments of the present invention is based on a novel integrated magnetics transformer assembly 200 depicted on FIG. 2. The present range of multiple-input isolated power converters eliminates the operational limitations and disadvantages of the above-mentioned prior art dual-input isolated boost DC-DC power converters.

Figure 2:
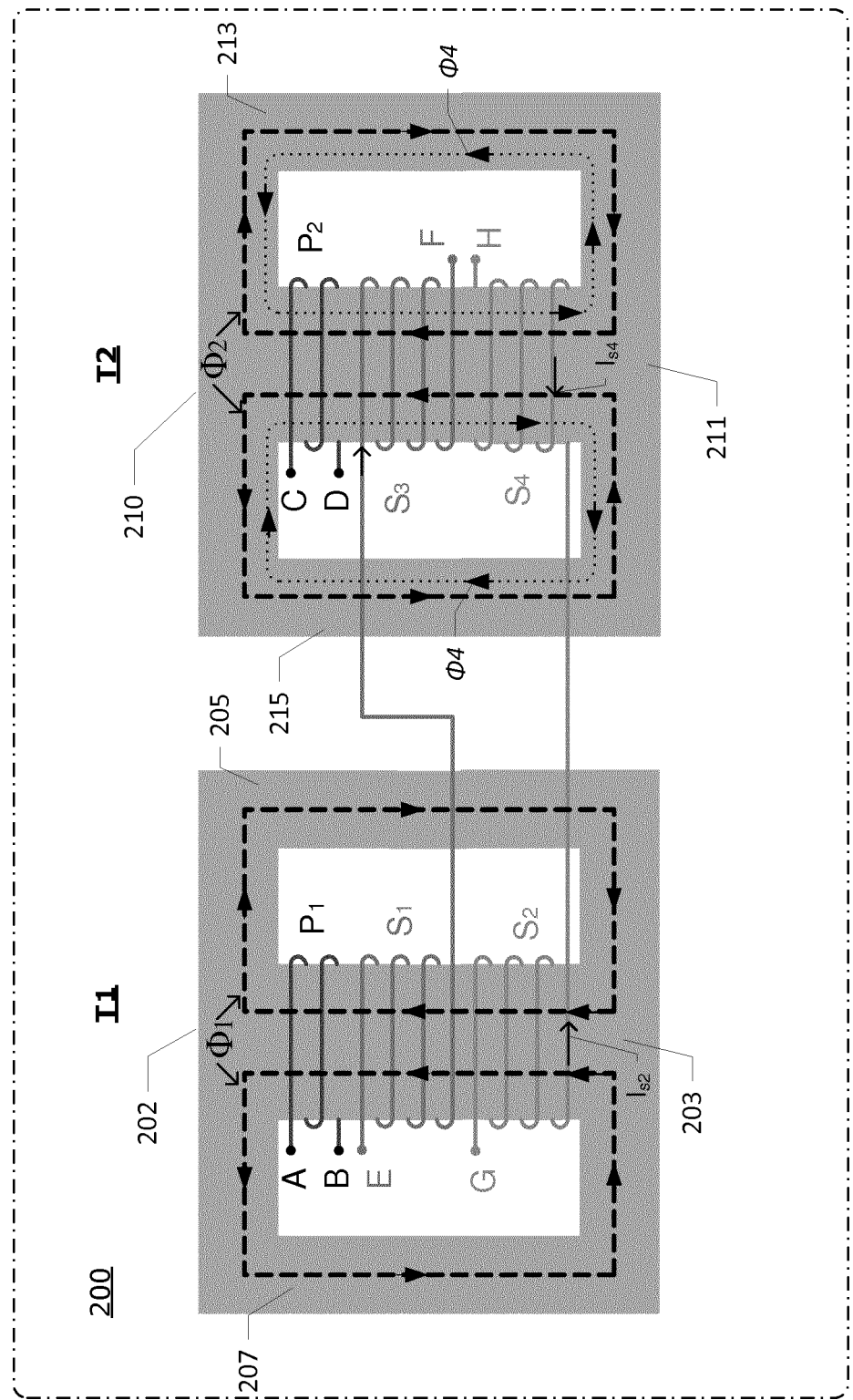
FIG. 2 is a schematic drawing of an integrated magnetics transformer assembly in accordance with a preferred embodiment of the invention.

FIG. 2 is a schematic drawing of an integrated magnetics transformer assembly 200, or discrete transformer assembly, in accordance with a preferred embodiment of the invention. The integrated magnetics transformer assembly comprises a first magnetically permeable core 202 and a second and separate magnetically permeable core 210. The first magnetically permeable core 202 is an E-shaped core which comprises a substantially straight center leg 203 arranged in-between a pair adjacent outer legs 207, 205. First and second parallel and substantially closed magnetic flux paths φ1 extend through the center leg 203 and the first and second outer legs 207, 205, respectively, when input current flows through a first input inductor winding P1. The second magnetically permeable core 210 is also E-shaped and may have substantially the same dimensions and magnetic properties as the first magnetically permeable core 202. The second magnetically permeable core 210 comprises a substantially straight center leg 211 arranged in-between a pair adjacent outer legs 215, 213. First and second parallel and substantially closed magnetic flux paths φ2 extend through the center leg 211 and the first and second outer legs 215, 213, respectively, when input current flows through a second input inductor winding P2. The skilled person will appreciate that each of the first and second magnetically permeable cores may possess various other shapes than the E-shaped form of the present embodiment—for example a toroid shape, a rectangular shape etc. Each of the first and second magnetically permeable cores 202, 210, respectively, preferably comprises a material possessing high magnetic permeability such as a soft magnetic material like Ferrite or a ferromagnetic alloy like Sheet steel, Silicon steel, Cast steel, Tungsten steel Magnet steel, cast iron, Nickel etc.

The first input inductor winding P1 is wound around a first predetermined segment of the straight center leg 203 of the first magnetically permeable core or first core 202 and a second input inductor winding P2 is wound around a first predetermined segment of the straight common center leg 211 of the second magnetically permeable core or second core 210. The integrated magnetics transformer assembly 200 further comprises a first output inductor winding comprising series coupled first and second half-windings S1, S3, respectively. The first half-winding S1 is wound around the center leg 203 of the first core 202 and arranged adjacently to the first input inductor winding P1. The second half-winding S3 is wound around the common center leg 211 of the second core 210 and arranged adjacently to the second input inductor winding P2. A second output inductor winding of integrated magnetics transformer assembly 200 comprises series or cascade coupled first and second half-windings S2, S4, respectively. The first half-winding S2 is wound around the common center leg 203 of the first core 202 and arranged adjacently to the first input inductor winding P1. The second half-winding S4 is wound around the common center leg 211 of the second core 210 and arranged adjacently to the second half-winding S3 of the first output inductor winding. In this manner, good magnetic coupling with minimal flux leakage is maintained between the first input inductor winding P1, the first half-winding S1 of the first output inductor winding and the first half-winding S2 of the second output inductor winding. Likewise, good magnetic coupling with minimal flux leakage is maintained between the second input inductor winding P2, the second half-winding S3 of the first output inductor winding and the second half-winding S4 of the second output inductor winding. The four separate half-windings S1, S2, S3 and S4 of the first and second output or secondary inductor windings have a special connection which leads to the previously discussed beneficial decoupling of the two primary or input inductor windings P1, P2 as explained in detail below. The first core 202 in conjunction with the first input inductor winding P1, first half-winding S1 of the first output inductor winding and the first half-winding S2 of the second output inductor winding form a first transformer T1. Likewise, the second core 210 in conjunction with the second input inductor winding P2, second half-winding S3 of the first output inductor winding and the second half-winding S4 of the second output inductor winding form a second transformer T2.

The directions of the magnetic flux running through the center leg 203 and the outer legs 205, 207 of the first core 202 are indicated by the respective flux arrows on the broken line indicating closed magnetic flux paths $\phi 1$. The depicted direction of the magnetic flux through the center leg 203 follows from the well-known right-hand rule for current flowing into winding termination A of the first input inductor winding P1 and out of winding termination B. Each of the first half-winding S1 of the first output inductor winding and the first half-winding S2 of the second output inductor winding is wound in the same direction as P1 around the common center leg 203. Consequently, the flow of magnetic flux through the common center leg 203 along the closed flux paths $\phi 1$ leads to generation of a positive current in the half-winding S1 running from depicted winding termination E to winding termination F at the end of the series coupled half-winding S3. This direction of current flow through half-windings S1 and S3 is indicated by a current arrow on the winding. Applying once again the right-hand rule to the depicted direction of current flow through the half-winding S3 leads to a resulting magnetic flux through the common center leg 211 of the second core 201 in the direction indicated by flux arrows on the fat broken line indicating the closed magnetic flux paths $\phi 2$. This is the same direction of magnetic flux as would be induced by a positive current flowing into winding termination C and out of winding termination D of the second input inductor winding P2.

However, the second half-winding S4 of the second output inductor winding has a reversed connection or winding orientation relative to the series connected first half-winding S2 as illustrated on the drawing such that current flowing into winding termination G, through the series connected half-windings S2 and S4 and out of winding termination H on S4 leads to an opposite current direction in S4 relative to the current direction in S2. This illustrated by the oppositely directed current arrow $I_{s2}$ indicating the direction of current flow in S2 and $I_{s4}$ indicating the direction of current flow in S4. By once again applying the right hand rule to the indicated direction of current flow in S4, the depicted direction of the induced magnetic flux through the dotted closed flux paths $\phi 4$ is obtained. Consequently, the magnetic flux induced by the current flow in half-winding S4 through the common center leg 211 flows in opposite direction to the magnetic flux induced by the current flow in half-winding S3 and the second input inductor winding P2 through the common center leg 211. The same oppositely directed magnetic fluxes $\phi 4$ generated by half-winding S4 extends through the entire closed flux paths $\phi 2$. This leads to beneficial magnetic flux cancellation in the common center leg 211 of the second core 210 and in flux cancellation in the residual legs of the core 210 as well. The skilled person will appreciate that the magnetic flux cancellation in the common center leg 211 can be either partial or substantially complete if the half-windings S3 and S4 are substantially identical, i.e. possessing the same number of windings.

To summarize the function of the inductor winding arrangement of the integrated magnetics transformer assembly 200, the second half-winding S3 of the first output inductor winding and the second half-winding S4 of the second output inductor winding are configured or oriented to produce oppositely directed magnetic fluxes through the closed magnetic flux paths $\phi 4$ and $\phi 2$ of the second core 210. The first half-winding S1 of the first output inductor winding and the first half-winding S2 of the second output inductor winding are configured to produce aligned, i.e. in the same direction, magnetic fluxes through the first substantially closed magnetic flux paths $\phi 1$. In the present embodiment, the cancellation of magnetic flux in the common center leg 211 of the second core 210 has been achieved by the reversed winding arrangement of the second half-winding S4 leading to a reversal of the direction of the magnetic flux. However, the skilled person will understand that the second input inductor winding may be arranged on the center leg 211 while one or both of the first and second half-windings of the output inductor winding may be arranged on one of the outer legs in other embodiments of the invention. In one exemplary embodiment, the second half-winding S4 is moved to the second outer leg 213 while the residual inductor windings are maintained as illustrated on FIG. 2. However, the second half-winding S4 is now arranged with the same winding orientation as the first half-winding S2 which leads to the generation of oppositely directed magnetic flux through the closed magnetic flux paths φ4 by the second half-winding S4 relative to the magnetic flux generated by second half-winding S3 through the closed magnetic flux paths φ2. Hence, magnetic flux cancellation is also achieved by this alternative placement and orientation of the second half-winding S4 on the second core 210.

The cancellation or suppression of the magnetic flux through the common center leg 211 of the second core 210 leads to a corresponding elimination or at least suppression of induced voltage in the second input inductor winding P2. Consequently, the induction of voltage in the second input inductor winding P2 by the flow of input current through the first input inductor winding P1 is either partly or fully eliminated leading to the previously discussed highly advantageous decoupling of the input inductor windings P1 and P2 of the integrated magnetics transformer assembly 200. Naturally, due to reciprocal nature of transformer action and assembly, the induction of voltage in the first input inductor winding P1 by the flow of input current through the second input inductor winding P2 is either partly or fully eliminated in a similar manner.

Figure 3:
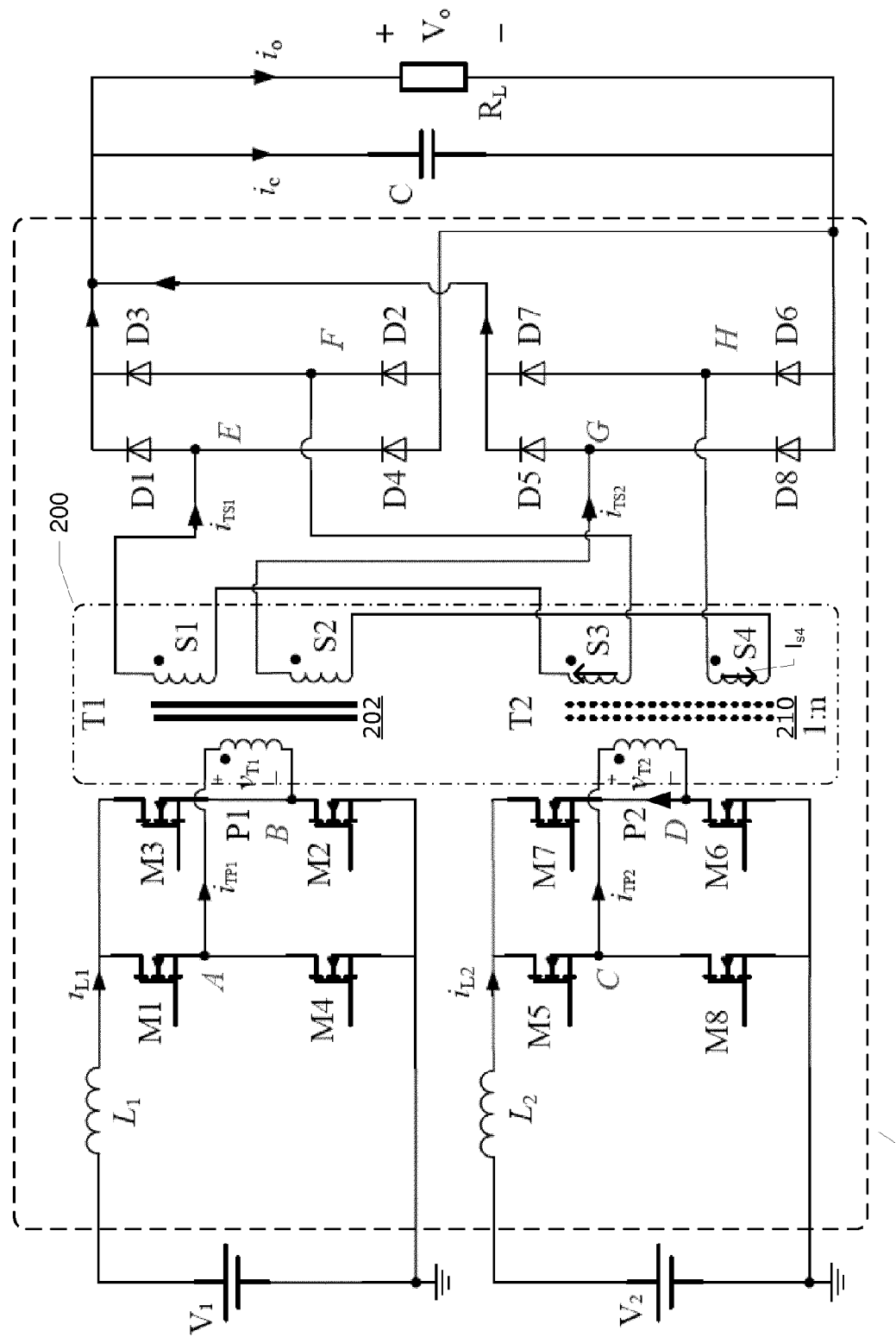
FIG. 3 is a schematic drawing of a dual-input isolated boost DC-DC power converter comprising an integrated magnetics transformer assembly in accordance with the above-mentioned preferred embodiment thereof.

FIG. 3 is a schematic drawing of a dual-input single output isolated boost DC-DC power converter 300 comprising an integrated magnetics transformer assembly 200 in accordance with the above-described preferred embodiments thereof. The integrated magnetics transformer assembly 200 has been depicted by its electrical equivalent of the mechanical transformer structure depicted on FIG. 2 above. Be kind to the notice the previous naming convention of the various input and output inductor windings of the first and second cores 202, 210, respectively, has been maintained to facilitate cross-reference. The turns ratio is 1:n as indicated on the figure where n may have a value between 0.1 to 100 such as between 2 and 16. The turns ratio being defined as the number of input inductor windings of each of the first and second input or primary side inductor windings P1 and P2 relative to the total number of windings on the series coupled first and second half-windings S1 and S3, or S2 and S4, of the respective output inductor windings.

The dual-input single output isolated boost DC-DC power converter 300 or DC-DC power converter 300 comprises a first and second independently operating converter sections or stages. The first converter section comprises a first input driver, comprising a MOS-FET based H-bridge M1-M4, electrically coupled to the first input inductor winding P1 through the pair of winding terminations or terminals A, B. The input side of the first input driver is coupled to a boost inductor $L_1$ arranged in series with an input voltage or power source $V_1$ schematically depicted as an ideal voltage source. The first H-bridge driver is configured to supply a first drive signal to the first input inductor winding P1 for example comprising a first PWM modulated drive signal. The DC-DC power converter 300 comprises furthermore a second input driver, likewise comprising a second MOS-FET based H-bridge comprising M5-M8, electrically coupled to the second input inductor winding P2 through the pair of winding terminations or terminals C, D. The input of the second input driver is coupled to a second boost inductor $L_2$ arranged in series with the second input voltage or power source $V_2$ schematically depicted as an ideal voltage source. The second H-bridge is configured to supply a second drive signal to the second input inductor winding P2 for example comprising a second PWM modulated drive signal. The duty cycle of each of the PWM modulated first and second drive signals may be selectively adjusted to control a rectified DC output voltage $V_O$ in conventional ways such as through a feedback control loop.

The DC voltage of the input voltage source $V_1$ may vary considerably depending on its type and specific characteristics. The DC voltage may for example have a value between 5 V and 100 V and the same applies for the DC voltage of the second input voltage source $V_2$.

Terminations E, F of the first output inductor winding, comprising series coupled first and second half-windings S1, S3, respectively, are electrically coupled to a first full-bridge output rectifier build around semiconductor diodes D1-D4. Hence, input voltage and power supplied by the first converter stage around core 202 is transferred to the rectified DC output voltage $V_O$ applied by an output of the first full-bridge output rectifier across output capacitor C and parallel load resistor $R_L$. In addition, the terminations G, H of the second output inductor winding, comprising series coupled first and second half-windings S2, S4, respectively, are electrically coupled to a second full-bridge output rectifier build around semiconductor diodes D5-D8. The output of the second full-bridge output rectifier is coupled to the output for the first full-bridge rectifier in parallel. Hence, input voltage and power supplied by the second converter stage around core 210 is transferred to a rectified DC output voltage $V_O$ across output capacitor C and parallel load resistor $R_L$. However, the previously discussed decoupling of the two primary or input inductor windings P1, P2 provided by the present integrated magnetics transformer assembly 200 eliminates the power coupling effects and the circulating currents discussed above in connection with the prior art DC-DC converters depicted on FIGS. 1A and 1B. The decoupling mechanism is schematically illustrated by the indicated reverse direction of current flow in the second half-winding S4 of the second output inductor winding and the second half-winding S3 of the first output inductor winding. By tracking the direction of current flow through the series coupled half-windings S1 and S3, as indicated by current arrow $i_{TS1}$, and current flow through series coupled half-windings S2 and S4, as indicated by current arrow $i_{TS2}$, it is readily apparent that the current flows in opposite directions through half-windings S3 and S4. These half-windings are both arranged around the common center leg 211 of the same core 210 as depicted on FIG. 2. Hence, the magnetic fluxes induced by these winding currents are oppositely directed and cancel through the common center leg as explained above. Consequently, the voltage reflected back to the input inductor winding P2 of the second core 210 by the resulting magnetic flux from the currents flowing in the half-windings S3 and S4 on the secondary or output side of the second core 210 is eliminated such that the above-discussed generation of circulating currents around the input inductor winding P2 and its associated input driver is eliminated.

The voltage transfer function between the DC output voltage $V_O$ across output capacitor C and the first DC input voltage $V_1$ and the second DC input voltage $V_2$ has a common transfer function that can be shown to be:

$$\frac{V_0}{n_1 V_1 + n_2 V_2} = \frac{1}{2(1-D)}$$

where $n_1$ is the turns ratio of the first core 202 and $n_2$ is the turns ratio of the second core 210; D is a duty cycle of identical PWM input drive signals applied by each of the H-bridge input drivers to the corresponding input inductor winding P1 or P2; Hence, there is common voltage transfer function such that the DC output voltage $V_O$ is determined by a weighted combination of the two DC input voltages $V_1$ and $V_2$. If the two DC input voltages are equal the present power converter 300 has the same voltage transfer function as the prior art boost-type power converter depicted on FIG. 1A and discussed above.

When the turns ratios of the first and second cores 202, 210 are identical this voltage transfer function reduces to:

$$\frac{V_0}{V_1 + V_2} = \frac{n_2}{2(1-D)}$$

This voltage transfer function is valid for zero phase difference or shift between the PWM drive signals applied to the first and second input inductor windings P1 and P2. The voltage transfer function of the present DC-DC power converter 300 leads to a very wide input voltage range and a wide output voltage range such that varying application specific constraints on minimum and maximum DC input voltage and/or DC output voltages can be met. Furthermore, several transformer design parameters, notably the turns ratios $n_1$ and $n_2$, are available for the designer of the power converter. Hence, the power converter designer is left with considerable flexibility in customizing performance metrics of the power converter, including input and output voltage ranges, allowing a specific power converter design to operate efficiently in a wide range of applications.

Another distinct advantage of the present DC-DC power converter 300 is that the DC output voltage $V_0$ is adjustable by controlling the phase difference (interleaving) between the PWM drive signals applied to the first and second input inductor windings P1 and P2. This provides a distinct flexibility advantage in connection with designing control scheme and devices for DC output voltage control. If the duty cycle is kept constant and phase shift control exploited to regulate the DC output voltage $V_0$, the maximum DC output voltage is achieved when the phase shift is 0° or 180°. The minimum DC output voltage V0 is achieved when the phase-shift is 90°.

Figure 10:
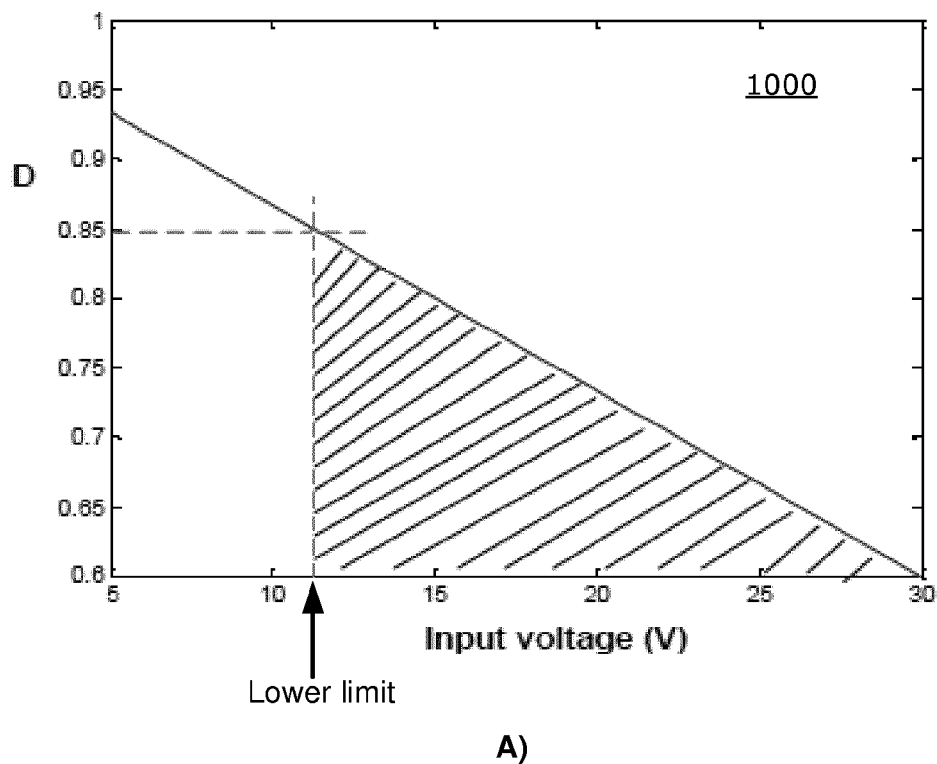
FIG. 10A shows an input voltage range for DC input voltage sources of a prior art multiple-input DC-DC boost power converter.
FIG. 10B shows input voltage ranges for first and second DC input voltage sources of the multiple-input isolated boost DC-DC power converter depicted on FIG. 3 in accordance with a preferred embodiment of the invention.
Figure 10:
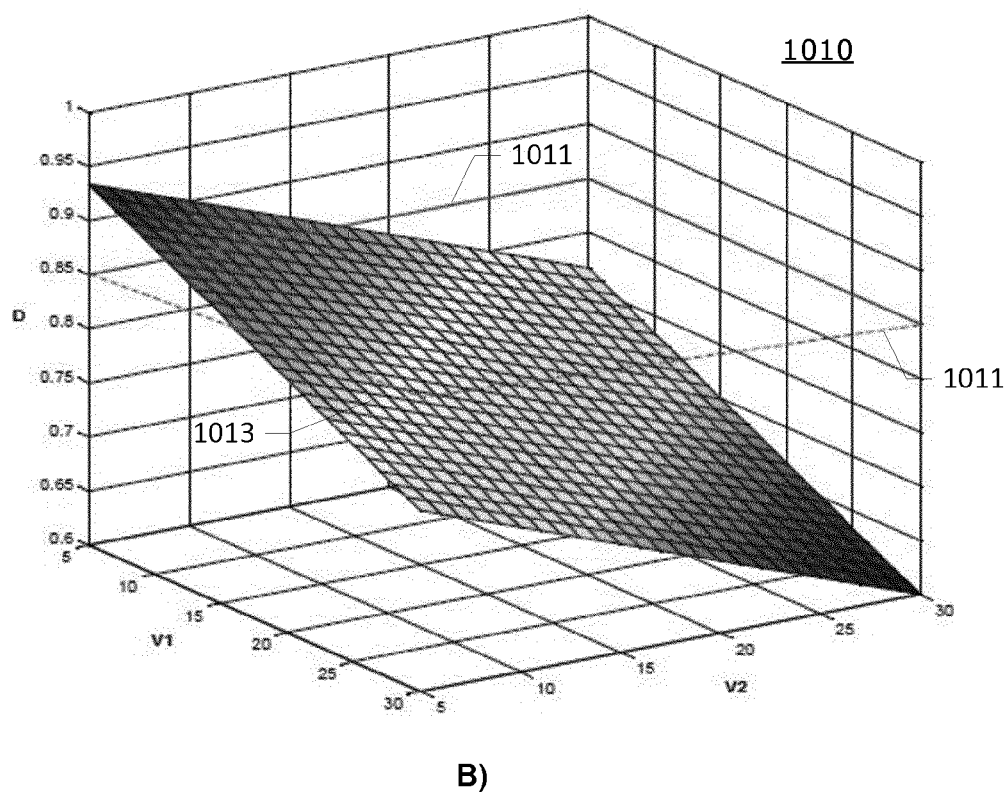

To illustrate the advantageous properties of the present DC-DC power converter 300 one can consider the following comparison with the prior art power converter of FIG. 1A discussed above. The two DC input voltage sources are both PV sources. In order to extract maximum power or energy from PV panels, individual maximum power point tracking (MPPT) control for each PV panel is typically required. The power converter output is connected to a constant DC bus at a desired DC voltage for example 150V. For the prior art DC-DC boost power converter of FIG. 1A, the input voltage range for each of the DC input voltage sources $V_1$ and $V_2$ is shown on the graph 1000 of FIG. 10A. None of the first and second DC input voltages can drop below the indicated lower limit at 11.3 V as indicated on the x-axis of graph 1000. Below this lower voltage limit, this prior art DC-DC boost power converter will operate at excessively high duty cycle D which leads to deteriorating converter performance in terms of conversion efficiency, gate driver performance etc. In the present example, the maximum allowable duty cycle D is set to an exemplary value of 85%. Applying the same duty cycle limitation or constraint to the present DC-DC power converter 300 taking the above-listed DC voltage transfer function into account, it is evident that lowest DC input voltages constraint (11.3 V above) has been relaxed. Thus, allowing considerably added flexibility as to the acceptable voltage ranges of the first and second DC input voltage sources. The dotted horizontal plane 1011 illustrates lower limits voltages of the first and second DC input voltage sources at the above discussed duty cycle D constraint of 85% or 0.85. For this constraint the lower limit voltages may for example be V1=5V and V2=17.5V or V1=V2=11.3V. The surface 1013 of the graph 1010 of FIG. 10B depicts the 3D relationship between the common duty cycle, D, of the PWM drive signals (vertical axis) and DC voltages V1 and V2 (x-axis and y-axis) provided by the first and second DC input voltage sources, respectively, for a fixed DC output voltage of 150 V. It is therefore obvious that the present DC-DC power converter 300 is suitable for diversity power sources for example a pair of solar panels which may be exposed to different environmental conditions at the same time (for example: one solar panel is hidden by a shadow of a tree or a building while the other solar panel is exposed to direct sunlight; or one solar panel is facing east while the other solar panel is facing west). These energy source characteristics with differing input voltages between several input voltage/energy sources and varying voltage level over time are often found in renewable energy applications. Hence, the present DC-DC power converter 300 is particularly well-adapted to make an efficient interface to these types of input energy sources due to the wide input voltage range and wide converter output voltage range of the converter 300.

Figure 4:
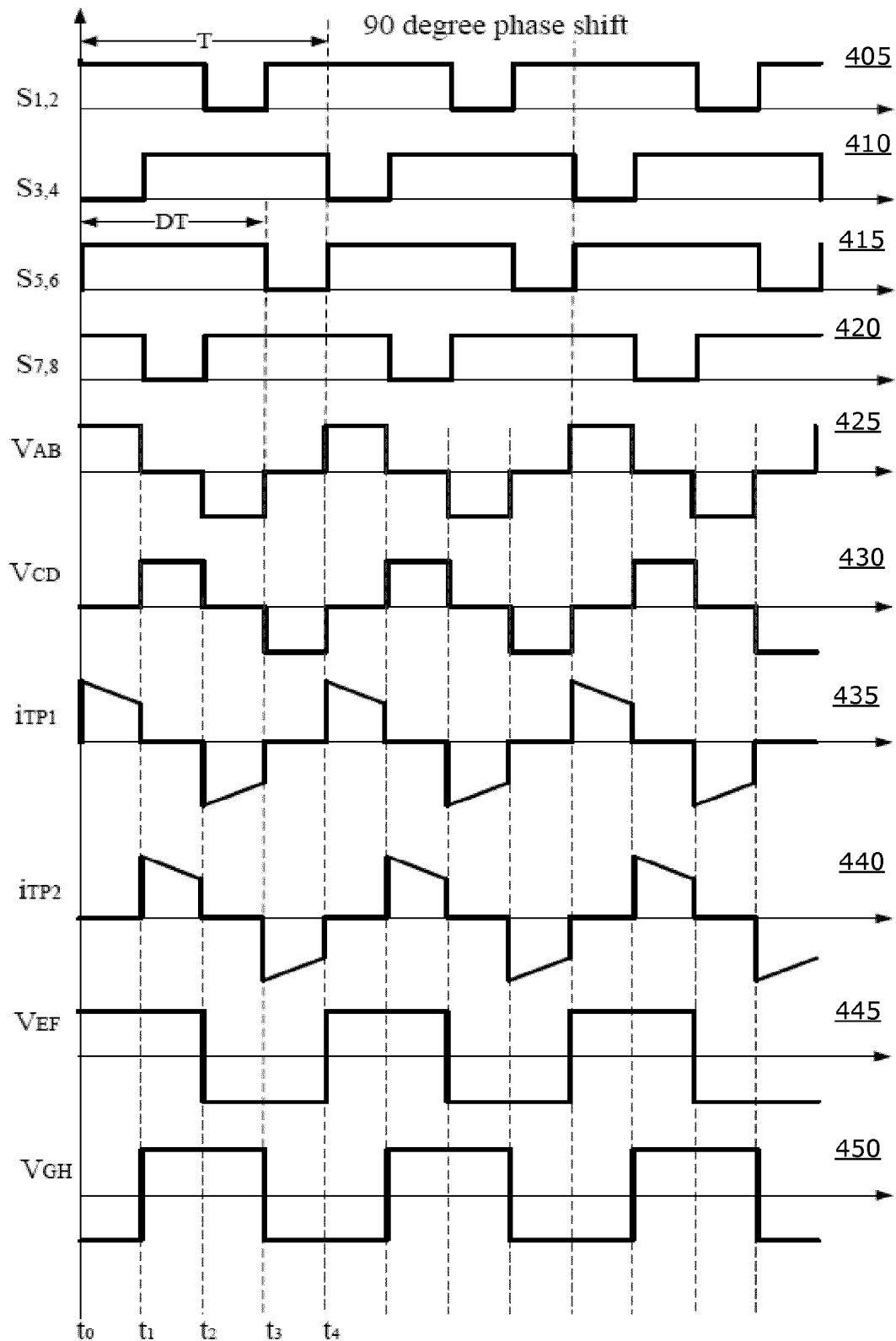
FIG. 4 shows a plurality of graphs depicting respective input, winding and output voltage waveforms of the dual-input isolated boost DC-DC converter for a 90 degrees phase angle shift between the first and second input voltage waveforms.

FIG. 4 shows a plurality of graphs 405-450 depicting respective input, winding and output voltage waveforms of the dual-input isolated boost DC-DC converter 300 of FIG. 3. Phases 1-4 of the current and voltage waveforms are indicated at lowermost portion of the graph by the vertical dotted lines and corresponding time symbols $t_0$, $t_1$, $t_2$, $t_3$, $t_4$. The depicted voltage and current waveforms represent a 90 degrees phase angle shift between the first and second PWM drive signals to the first and second input inductor windings P1 and P2, respectively. Hence, the first and second converter stages, around transformers T1 and T2, respectively, of the dual-input isolated boost DC-DC converter 300 operate with a phase shift of 90 degrees.

The upper graphs 405, 410 show the respective PWM waveforms of MOSFET switch drive signals $S_{1,2}$ and $S_{3,4}$ of the MOSFET switches M1-M4 of the first H-bridge input driver. The following graphs 415, 420 show respective PWM waveforms of MOSFET switch drive signals $S_{5,6}$ and $S_{7,8}$ of the MOSFET switches M5-M8 of the second H-bridge input driver Graph 425 shows the waveform of the first PWM drive signal $V_{A,B}$ that is applied to the first input or primary side inductor winding P1. This waveform has a period time T and a switching duty cycle of 75%. As indicated, the graph 430 shows the 90 degrees phase shifted waveform of the second PWM drive signal $V_{C,D}$ applied to the second input or primary side inductor winding P2. This signal has the same period time T and the same switching duty cycle of about 75% as the first drive signal.

Graphs 435, 440 show the respective corresponding current waveform of winding currents in P1 and P2. It is evident that each of the first and second boost inductors $L_1$ and $L_1$ are charged in phases 2 and 4 and discharged into their respective primary side inductor windings P1, P2 in phases 1 and 3 albeit with reversed polarity.

Graph 445 depicts the voltage waveform $V_{EF}$ induced across the terminations E, F of the first output inductor winding, comprising series coupled first and second half-windings S1, S3, respectively. Graph 450 depicts the voltage waveform $V_{GH}$ induced across the terminations G, H of the second output inductor winding, comprising series coupled first and second half-windings S2, S4, respectively. The 90 degrees phase shift between the first and second PWM input drive signals is clearly reflected in the voltage waveforms $V_{EF}$ and $V_{GH}$ of the secondary or output transformer windings.

Figure 5A:
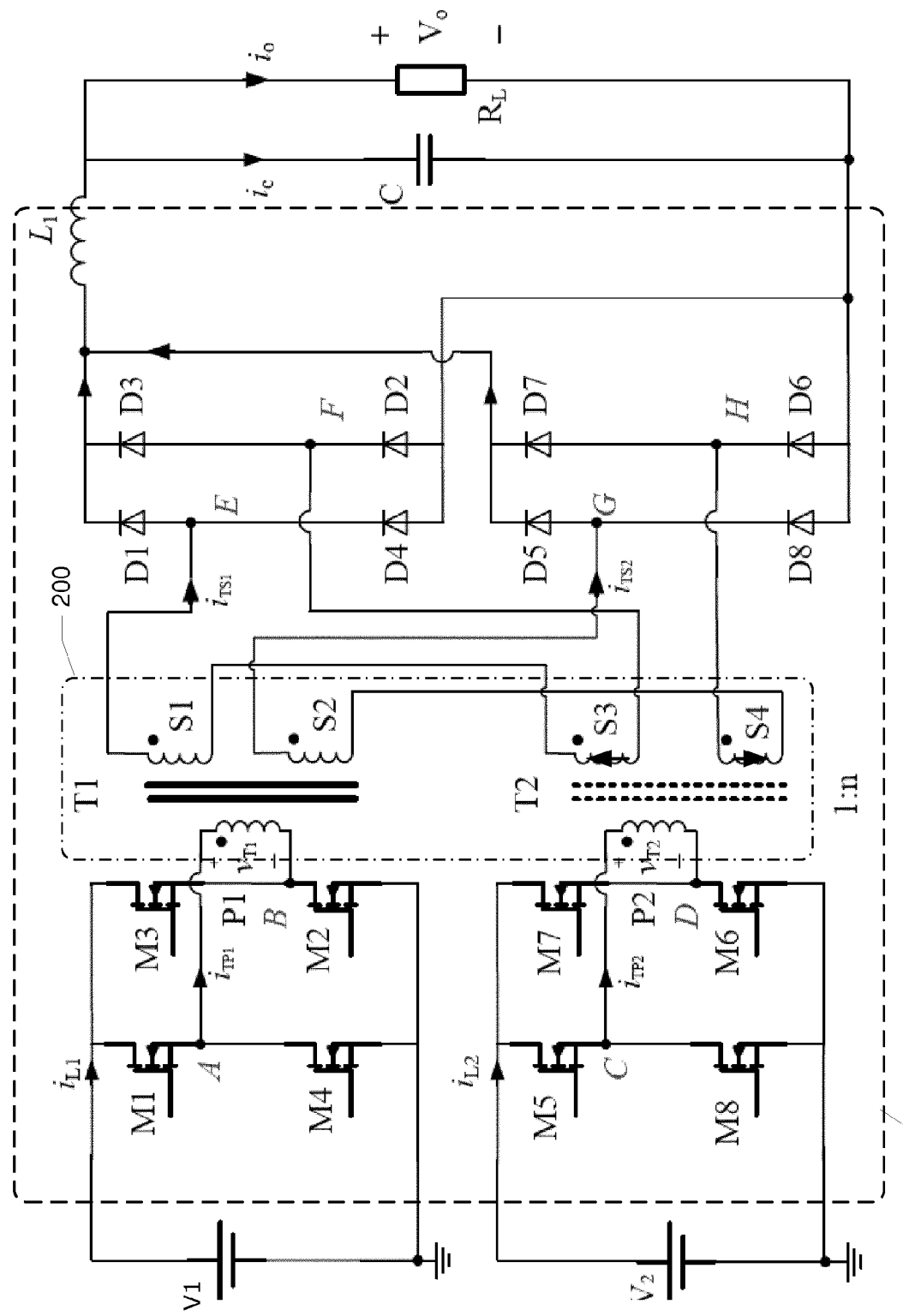
FIG. 5A is a schematic drawing of a first type of dual-input isolated buck DC-DC power converter comprising the integrated magnetics transformer assembly in accordance with the above-mentioned preferred embodiment thereof.

FIG. 5A is a schematic drawing of a dual-input single output isolated buck DC-DC power converter 500 comprising an integrated magnetics transformer assembly 200 in accordance with the above-described preferred embodiments thereof. The application of the integrated magnetics transformer assembly 200 in the present buck DC-DC power converter provides a unique possibility for sharing the output or buck inductor $L_1$ and output capacitor C. Hence, the buck DC-DC power converter achieves an important reduction of the number of external components compared to prior art dual-input buck type DC-DC power converters.

Figure 5B:
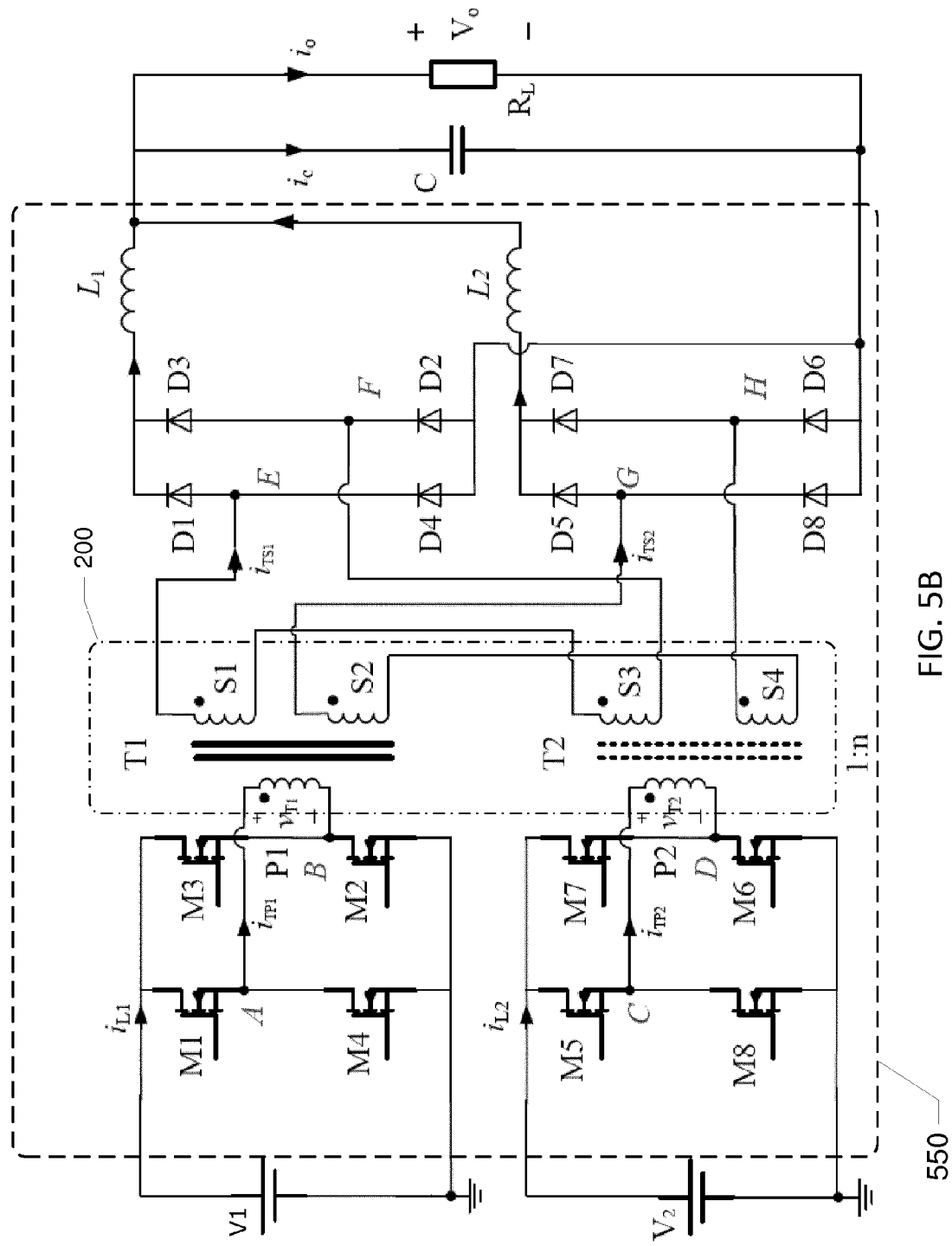
FIG. 5B is a schematic drawing of a second type of dual-input isolated buck DC-DC power converter comprising the integrated magnetics transformer assembly in accordance with the above-mentioned preferred embodiment thereof.

FIG. 5B is a schematic drawing of another embodiment of a dual-input single output isolated buck DC-DC power converter 550 comprising an integrated magnetics transformer assembly 200 in accordance with the above-described preferred embodiments thereof. In contrast to the first buck converter 500 described above, the present embodiment comprises separate first and second output/buck inductor $L_1$ and $L_2$ coupled between respective ones of the first and second rectifier outputs and the common DC output of the DC-DC power converter 550.

Figure 6:
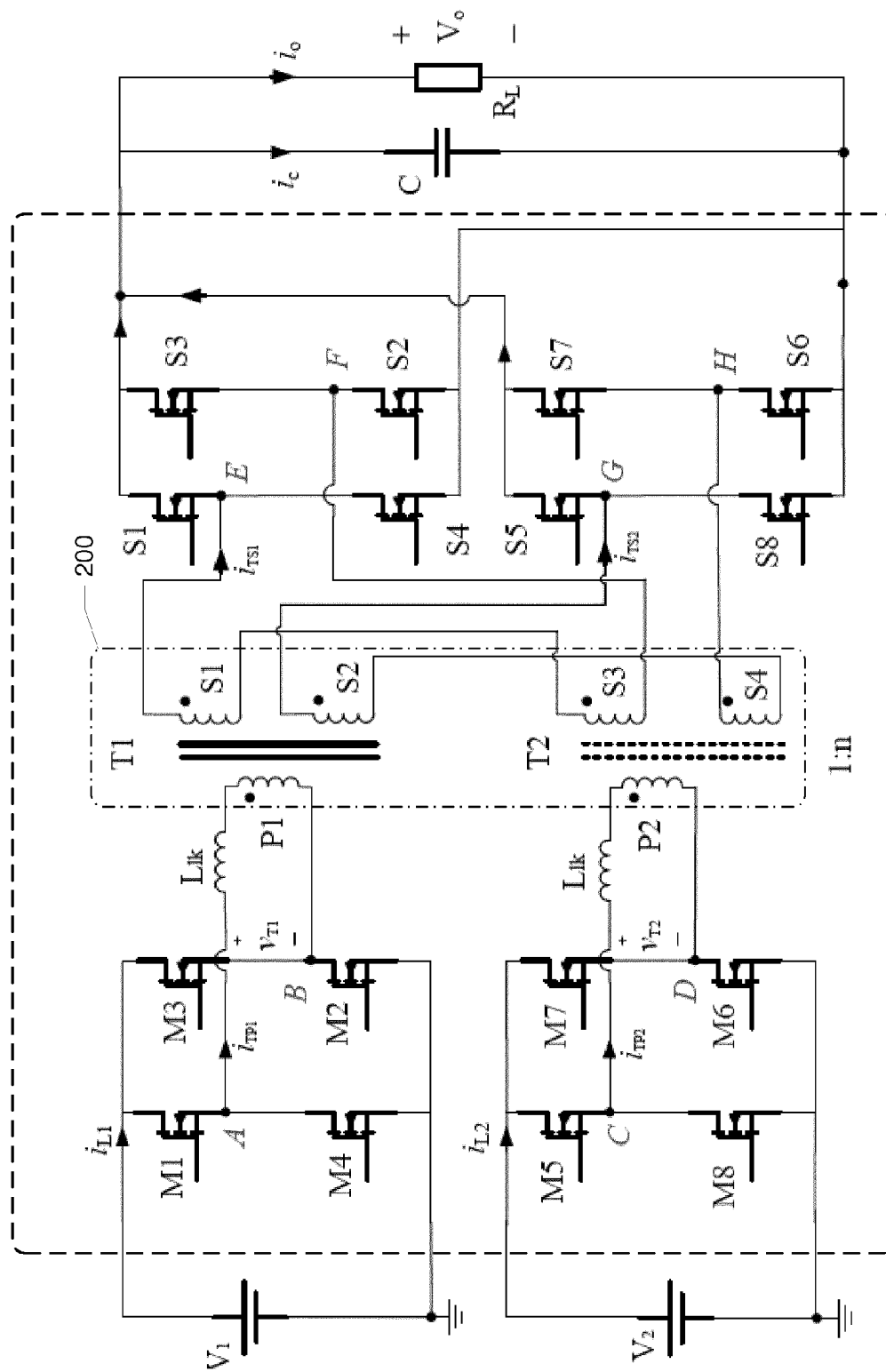
FIG. 6 is a schematic drawing of a dual-input DAB topology DC-DC power converter comprising the integrated magnetics transformer assembly in accordance with the above-mentioned preferred embodiments thereof.

FIG. 6 is a schematic drawing of a dual-input dual active bridge (DAB) topology DC-DC power converter 600 comprising an integrated magnetics transformer assembly 200 in accordance with the above-described preferred embodiments thereof. A first active full-wave rectifier is formed around MOS-FETs S1-S4 and a second active full-wave rectifier is formed around MOS-FETs S5-S8.

Figure 7:
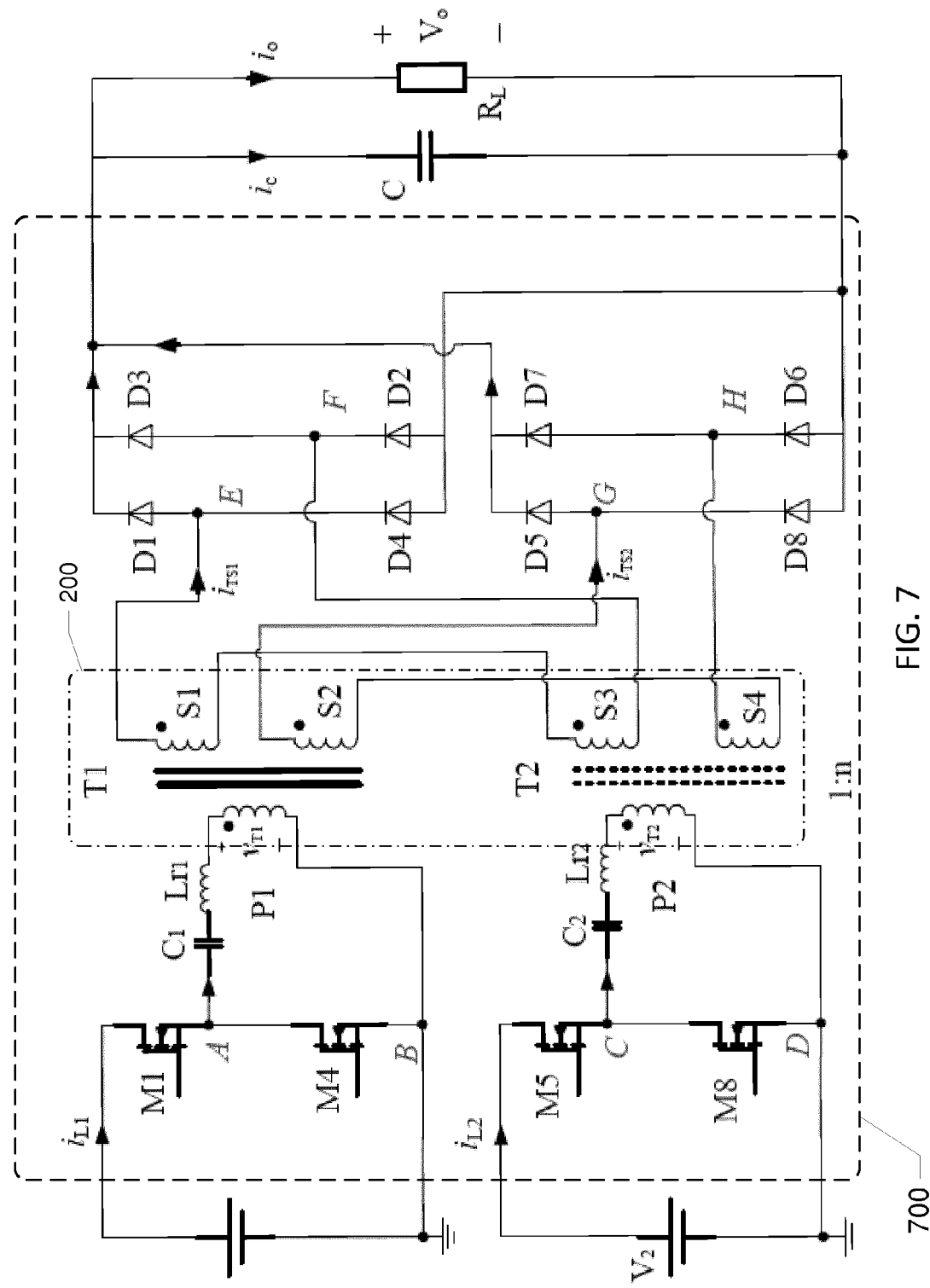
FIG. 7 is a schematic drawing of a dual-input isolated LLC topology DC-DC power converter comprising the integrated magnetics transformer assembly in accordance with the above-mentioned preferred embodiment thereof.

FIG. 7 is a schematic drawing of a dual-input isolated two inductor ($L_{I1}$ and $L_{I2}$) and capacitor ($C_1$ and $C_2$) (LLC) topology DC-DC power converter 700 comprising the integrated magnetics transformer assembly 200 in accordance with the above-mentioned preferred embodiments thereof.

Figure 8:
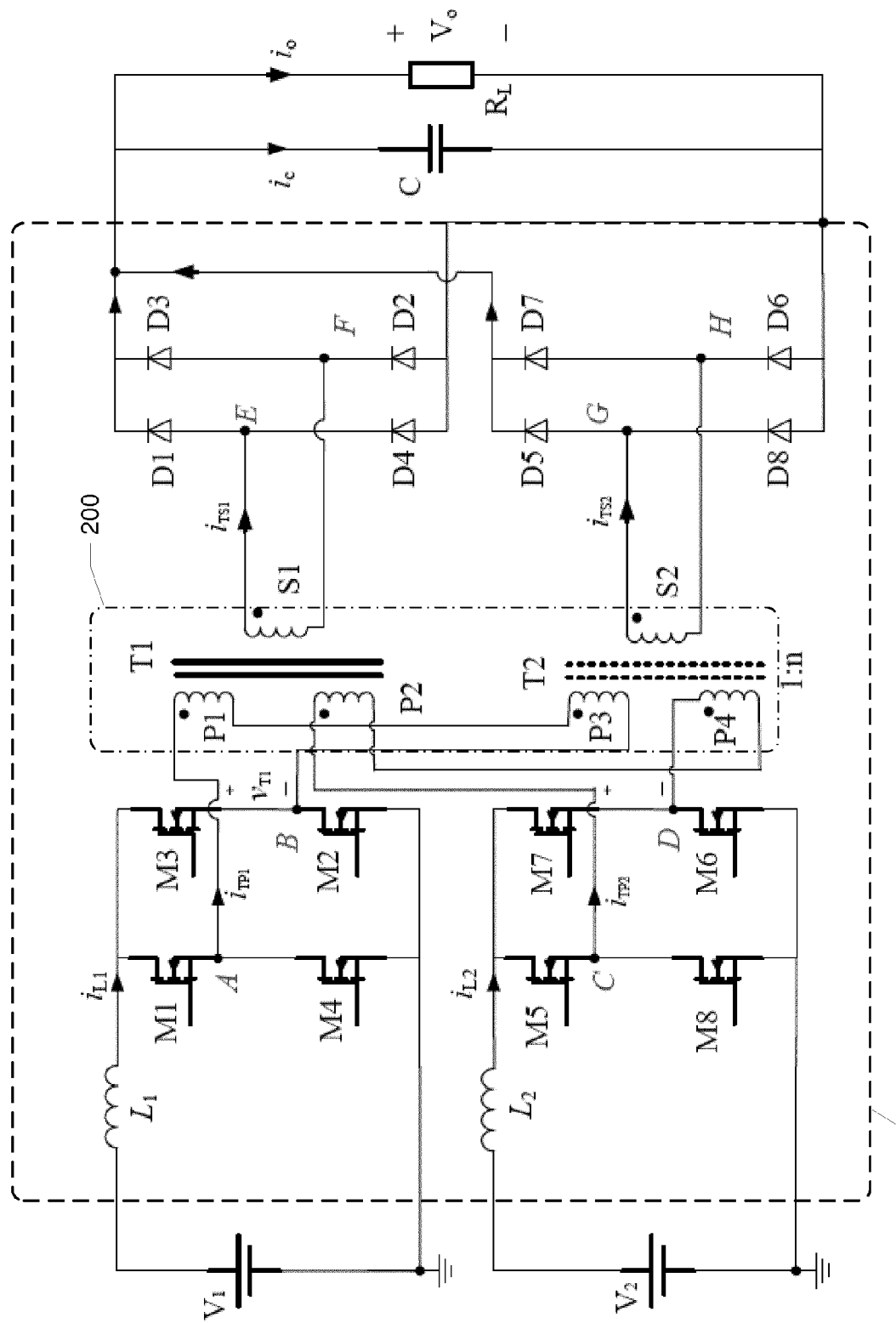
FIG. 8 is a schematic drawing of a dual-input DC-DC power converter with a side-shifted winding arrangement comprising the integrated magnetics transformer assembly in accordance with the above-mentioned preferred embodiment thereof.

FIG. 8 is a schematic drawing of a dual-input boost DC-DC power converter 800 with side-shifted windings comprising the integrated magnetics transformer assembly 200 in accordance with the above-mentioned preferred embodiment thereof. In this embodiment of the invention, the terminations of the series coupled first and second half-windings S1 and S3, of the first output inductor winding, are coupled to the input side of the DC-DC power converter more specifically to the complementary outputs of the first input H-bridge driver. Likewise, the terminations of the series coupled first and second half-windings S2 and S4 of the second output inductor winding are also coupled to the input side of the DC-DC power converter—more specifically to the complementary outputs of the second H-bridge driver. Hence, the letter references of these half-windings have been changed from 'S' to 'P'. The first and second input or primary side inductor windings P1 and P2 are now arranged at the output side of the DC-DC power converter 800—more specifically coupled to the respective first and second full-bridge rectifiers. Hence, the letter references of these input inductor windings have been changed from 'P' to 'S'. The skilled person will understand that the present dual-input boost DC-DC power converter 800 may possess substantially the same power converter characteristics as the earlier discussed dual-input boost DC-DC power converter embodiment 300 of FIG. 3 by simply reversing the turns ratio n of each of the transformers T1 and T2 of the integrated magnetics transformer assembly 200. Hence, the skilled person will appreciate that the designations 'input' of the first and second input inductor windings P1 and P2 and the term 'output' of the first and second output inductor windings are all arbitrary and may be interchanged depending on how the integrated magnetics transformer assembly 200 is coupled in a specific DC-DC power converter design.

Figure 9:
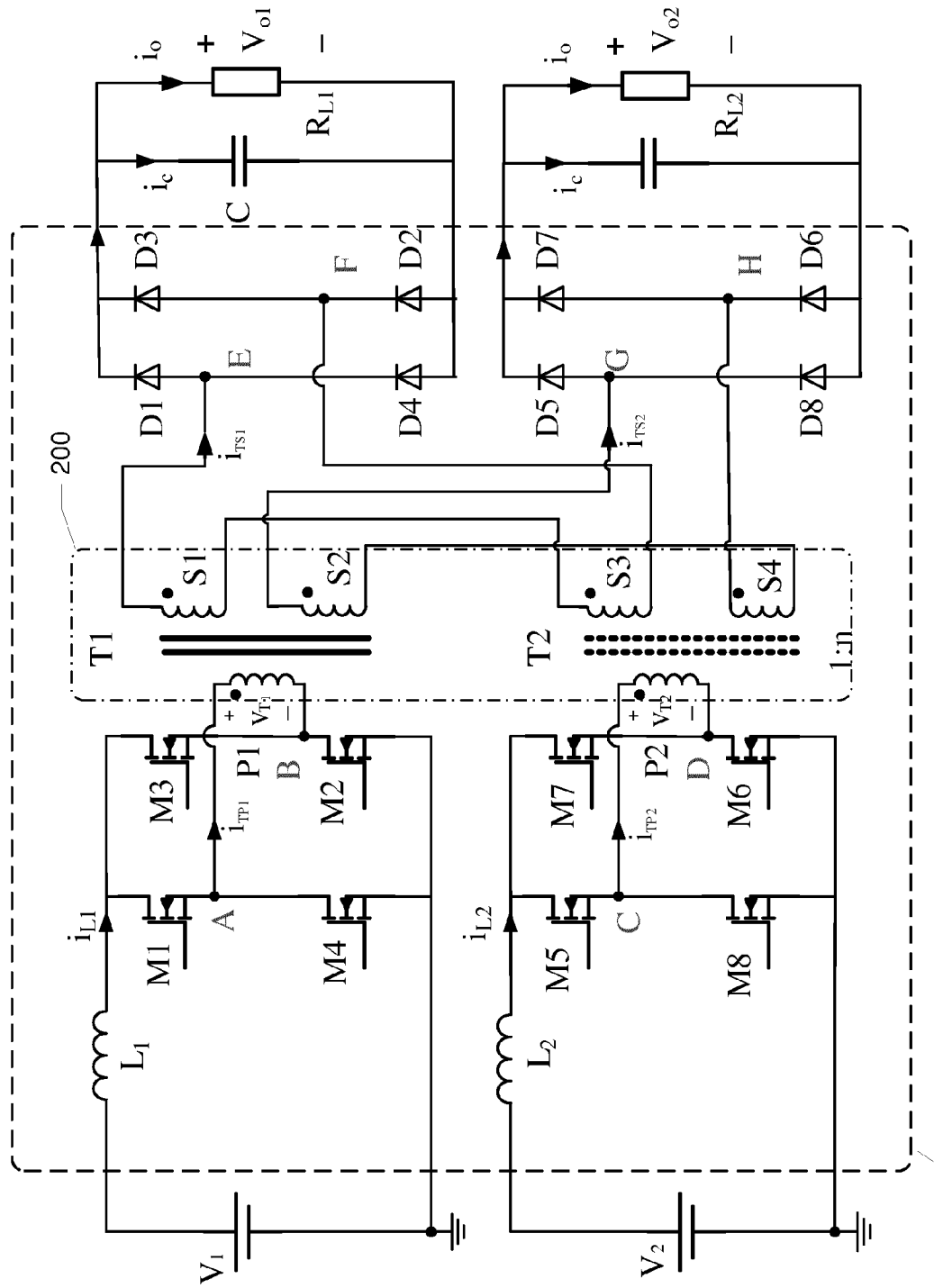
FIG. 9 is a schematic drawing of a dual-input and dual-output isolated boost DC-DC power converter comprising an integrated magnetics transformer assembly in accordance with the above-mentioned preferred embodiments thereof.

FIG. 9 is a schematic drawing of a dual-input and dual-output isolated boost DC-DC power converter 900 comprising an integrated magnetics transformer assembly 200 in accordance with the above-mentioned preferred embodiments thereof. The present boost DC-DC power converter 900 comprises two separate converter DC output voltages $V_{O1}$ and $V_{O2}$ provided across two separate output capacitors $C_1$ and $C_2$. The earlier discussed isolated boost DC-DC power converter 300 is configured to produce a single converter output having a common DC output voltage. However, the inventive integrated magnetics transformer assembly 200 can also be used in multiple-input and dual outputs power converter topologies. The first DC output voltage $V_{O1}$ is generated by a first full-wave rectifier comprising diodes D1-D4 having respective inputs coupled to winding terminations E, F of the first half-winding S1 and the second half-winding S3 of the first output inductor winding. The second DC output voltage $V_{O2}$ is generated by a second full-wave rectifier comprising diodes D5-D8 having respective inputs coupled to winding terminations G, H of the first half-winding S2 and the second half-winding S4 of the second output inductor winding. In traditional or prior art multiple outputs DC-DC power converters, the cross-regulation problem associated with the converter outputs makes output voltage control or regulation difficult. If one of the converter outputs is heavily or lightly loaded, the DC-DC power converter may cease to function. However, the present dual-input and dual-output isolated boost DC-DC power converter 900 renders the two separate converter DC output voltages $V_{O1}$ and $V_{O2}$ completely independent. The DC output voltages $V_{O1}$ and $V_{O2}$ are uncoupled even though multiple transformer windings are used on the first and second transformers T1 and T2. Another advantage is that the respective converter loads, schematically illustrated by first and second load resistors $R_{L1}$ and $R_{L2}$ are capable of sharing the total energy delivered by both input voltage or energy sources $V_1$ and $V_2$. The distribution of output power between the first and second load resistors load resistors $R_{L1}$ and $R_{L2}$ at the first and second converter outputs can be controlled by shifting the phase (interleaving) of the previously discussed PWM drive signals applied to the first and second input inductor windings P1 and P2, respectively, of the first and second transformers T1 and T2. For example, when the phase shift between the PWM input drive signals is zero, the full output power is delivered to the first load resistor $R_{L1}$ while zero output power is delivered to the second load resistor $R_{L2}$. If the phase shift between the PWM drive signals is adjusted to 90 degrees, the output power is split equally between the first load resistor $R_{L1}$ and the second load resistor $R_{L2}$. If the phase shift between the PWM input drive signals is set to 180 degrees, the full output power is delivered to the second load resistor $R_{L2}$ while zero output power is delivered to the first load resistor $R_{L1}$. Any other desired power distribution between the first and second converter loads can be obtained by an appropriate setting of the phase shift between the PWM input drive signals.

The invention claimed is:

1. An integrated magnetics transformer assembly comprising:
    a first magnetically permeable core forming a first substantially closed magnetic flux path
    a second magnetically permeable core forming a second substantially closed magnetic flux path,
    a first input inductor winding wound around a first predetermined segment of the first magnetically permeable core and a second input inductor winding wound around a first predetermined segment of the second magnetically permeable core, a first output inductor winding comprising series coupled first and second half-windings wherein the first half-winding is wound around a second predetermined segment of the first magnetically permeable core and the second half-winding is wound around a second predetermined segment of the second magnetically permeable core, a second output inductor winding comprising series coupled first and second half-windings wherein the first half-winding is wound around a third predetermined segment of the first magnetically permeable core and the second half-winding is wound around a third predetermined segment of the second magnetically permeable core;

wherein the second half-winding of the first output inductor winding and the second half-winding of the second output inductor winding are configured to produce oppositely directed magnetic fluxes through the second substantially closed magnetic flux path; and the first half-winding of the first output inductor winding and the first half-winding of the second output inductor winding are configured to produce aligned magnetic fluxes through the first substantially closed magnetic flux path.

2. An integrated magnetics transformer assembly according to claim 1, wherein the first half-winding of the first output inductor winding and the first half-winding of the second output inductor winding are wound around a common straight leg of the first magnetically permeable core; and the second half-winding of the first output inductor winding and the second half-winding of the second output inductor winding are wound around a common straight leg of the second magnetically permeable core; wherein the first half-winding of the first output inductor winding and the first half-winding of the second output inductor winding are connected in same direction and the second half-winding of the first output inductor winding and the second half-winding of the second output inductor winding are connected in reverse direction.

3. An integrated magnetics transformer assembly according to claim 2, wherein the first input inductor winding is wound around the common straight leg of the first magnetically permeable core; and the second input inductor winding is wound around the common straight leg of the second magnetically permeable core.

4. An integrated magnetics transformer assembly according to claim 3, wherein:

the first input inductor winding, the first half-winding of the first output inductor winding and the first half-winding of the second output inductor winding are arranged adjacently on the common straight leg of the first magnetically permeable core; and the second input inductor winding, the second half-winding of the first output inductor winding and the second half-winding of the second output inductor winding are arranged adjacently on the common straight leg of the second magnetically permeable core.

5. An integrated magnetics transformer assembly according to claim 2, wherein:

the first magnetically permeable core comprises a first substantially rectangular core portion formed by mechanical coupling of three substantially straight legs and the common straight leg; and the second magnetically permeable core comprises a second substantially rectangular core portion formed by mechanical coupling of three substantially straight legs and the common straight leg.

6. An integrated magnetics transformer assembly according to claim 5, comprising first and second magnetically permeable E-shaped cores each comprising the common leg arranged in-between a pair adjacent outer legs.

7. An integrated magnetics transformer assembly according to claim 1, comprising a holding member attached to the first and second magnetically permeable cores to fix the first and second magnetically permeable cores in a predetermined spatial relationship.

8. An integrated magnetics transformer assembly according to claim 7, wherein the holding member comprises a printed circuit board.

9. An integrated magnetics transformer assembly according to claim 4, comprising a multi-layer printed circuit board having a first through going aperture and a second through going aperture;

the common straight leg of the first magnetically permeable core projecting through the first through going aperture and the common straight leg of the second magnetically permeable core projecting through the second through going aperture; and a first board wiring pattern arranged around the first through going aperture and comprising at least one of the first input inductor winding, the first half-winding of the first output inductor winding and the first half-winding of the second output inductor winding; and a second hoard wiring pattern arranged around the second through going aperture and comprising at least one of the second input inductor winding, the second half-winding (s3) of the first output inductor winding and the second half winding of the second output inductor winding.

10. An integrated magnetics transformer assembly according to claim 7, wherein the first and second magnetically permeable cores are separated by distance of at least 6 mm by the holding member.

11. An integrated magnetics transformer assembly according to claim 1, wherein the first and second half-windings of the first output inductor winding comprises the same number of turns and the first and second half-windings of the second output inductor winding comprises the same number of turns.

12. A single input or multiple-input isolated power converter comprising an integrated magnetics transformer assembly according to claim 1; and a first input terminal connectable to a first DC or AC input voltage, a first input driver operatively coupled to the first DC or AC input voltage and the first input inductor winding to supply a first drive signal thereto, a second input terminal connectable to the first DC or AC input voltage or a second DC or AC input voltage, a second input driver operatively coupled to the first or second DC or AC input voltage and the second input inductor winding to supply a second drive signal thereto, a first rectifier or a first inverter element operatively coupled between a first converter output and a pair of winding terminations of the series coupled first and second half-windings of the first output inductor winding;

a second rectifier or a second inverter element operatively coupled between a second converter output and a pair of winding terminations of the series connected first and second half-windings of the second output inductor winding.

13. A single input or multiple-input isolated power converter comprising an integrated magnetics transformer assembly according to claim 1; and
- a first input terminal connectable to a first DC or AC input voltage,
- a first input driver operatively coupled to the first DC or AC input voltage and a pair of winding terminations of the series coupled first and second half-windings of the first output inductor winding to supply a first drive signal thereto,
- a second input terminal connectable to the first DC or AC input voltage or a second DC or AC input voltage,
- a second input driver operatively coupled to the first or second DC or AC input voltage and a pair of winding terminations of the series connected first and second half-windings of the second output inductor winding to supply a second drive signal thereto,
- a first rectifier or a first inverter element operatively coupled between a first converter output and a pair of winding terminations of the first input inductor winding,
- a second rectifier or a second inverter element operatively coupled between a second converter output and a pair of winding terminations of the second input inductor winding.

14. A multiple-input isolated power converter according to claim 12, wherein the first converter output and the second converter output are coupled to separate output voltage terminals of the converter to supply first and second separate AC output voltages or first and second separate DC output voltages.

15. A multiple-input isolated power converter according to claim 12, comprising a boost converter, said boost converter comprising:
- a first boost inductor coupled between the first DC or AC input voltage and the first input driver,
- a second boost inductor coupled between the second DC or AC input voltage and the second input driver.

16. An integrated magnetics transformer assembly according to claim 8, comprising a multi-layer printed circuit board having a first through going aperture and a second through going aperture;
- the common straight leg of the first magnetically permeable core projecting through the first through going aperture and the common straight leg of the second magnetically permeable core projecting through the second through going aperture; and
- a first board wiring pattern arranged around the first through going aperture and comprising at least one of the first input inductor winding, the first half-winding of the first output inductor winding and the first half-winding of the second output inductor winding; and
- a second board wiring pattern arranged around the second through going aperture and comprising at least one of the second input inductor winding, the second half-winding (s3) of the first output inductor winding and the second half-winding of the second output inductor winding.

17. A multiple-input isolated power converter according to claim 13, wherein the first converter output and the second converter output are coupled to separate output voltage terminals of the converter to supply first and second separate AC output voltages or first and second separate DC output voltages.

18. A multiple-input isolated power converter according to claim 13, comprising a boost converter, said boost converter comprising:
- a first boost inductor coupled between the first DC or AC input voltage and the first input driver,
- a second boost inductor coupled between the second DC or AC input voltage and the second input driver.

* * * * *